United States Patent
Teichert

[11] Patent Number: 5,339,783
[45] Date of Patent: Aug. 23, 1994

[54] THROTTLE BREAKOVER APPARATUS

[75] Inventor: Ulrich J. Teichert, Portland, Oreg.

[73] Assignee: Freightliner Corporation, Portland, Oreg.

[21] Appl. No.: 88,860

[22] Filed: Jul. 7, 1993

[51] Int. Cl.[5] .............................................. F02D 11/04
[52] U.S. Cl. ...................................... 123/400; 74/513
[58] Field of Search ..................... 123/396, 400, 342; 74/513, 502.6

[56] References Cited

U.S. PATENT DOCUMENTS

| | | | |
|---|---|---|---|
| 2,312,274 | 2/1943 | Stortz | 74/513 |
| 2,848,216 | 8/1958 | McGurk | 74/513 |
| 3,187,603 | 6/1965 | Haddad | 74/502.6 |
| 3,977,371 | 8/1976 | Mitchell et al. | 123/396 |
| 3,981,207 | 9/1976 | Stant et al. | 74/513 |
| 4,875,449 | 10/1989 | Krämer et al. | 123/400 |
| 4,928,647 | 5/1990 | Villanyi et al. | 123/400 |
| 5,163,401 | 11/1992 | Reese | 123/352 |
| 5,191,866 | 3/1993 | Tosdale | 123/400 |

Primary Examiner—Raymond A. Nelli
Assistant Examiner—Thomas N. Moulis
Attorney, Agent, or Firm—Klarquist Sparkman Campbell Leigh & Whinston

[57] ABSTRACT

The throttle breakover apparatus has a cable with one end coupled to an accelerator pedal and a second end terminating in a cable stop. The cable second end is slidably coupled to an engine throttle lever at a position inward from the cable stop. A sleeve surrounds the cable and extends from the cable stop through the throttle lever. A coil spring surrounds the sleeve and is positioned between the throttle lever and the cable stop. A spring guide guides the motion of the coil spring. In response to the depression of the accelerator pedal, the throttle cable first pivots the throttle lever to a full throttle position. Once full throttle is reached, the coil spring is compressed between the cable stop and the throttle lever and absorbs the additional "breakover" movement of the cable.

17 Claims, 2 Drawing Sheets

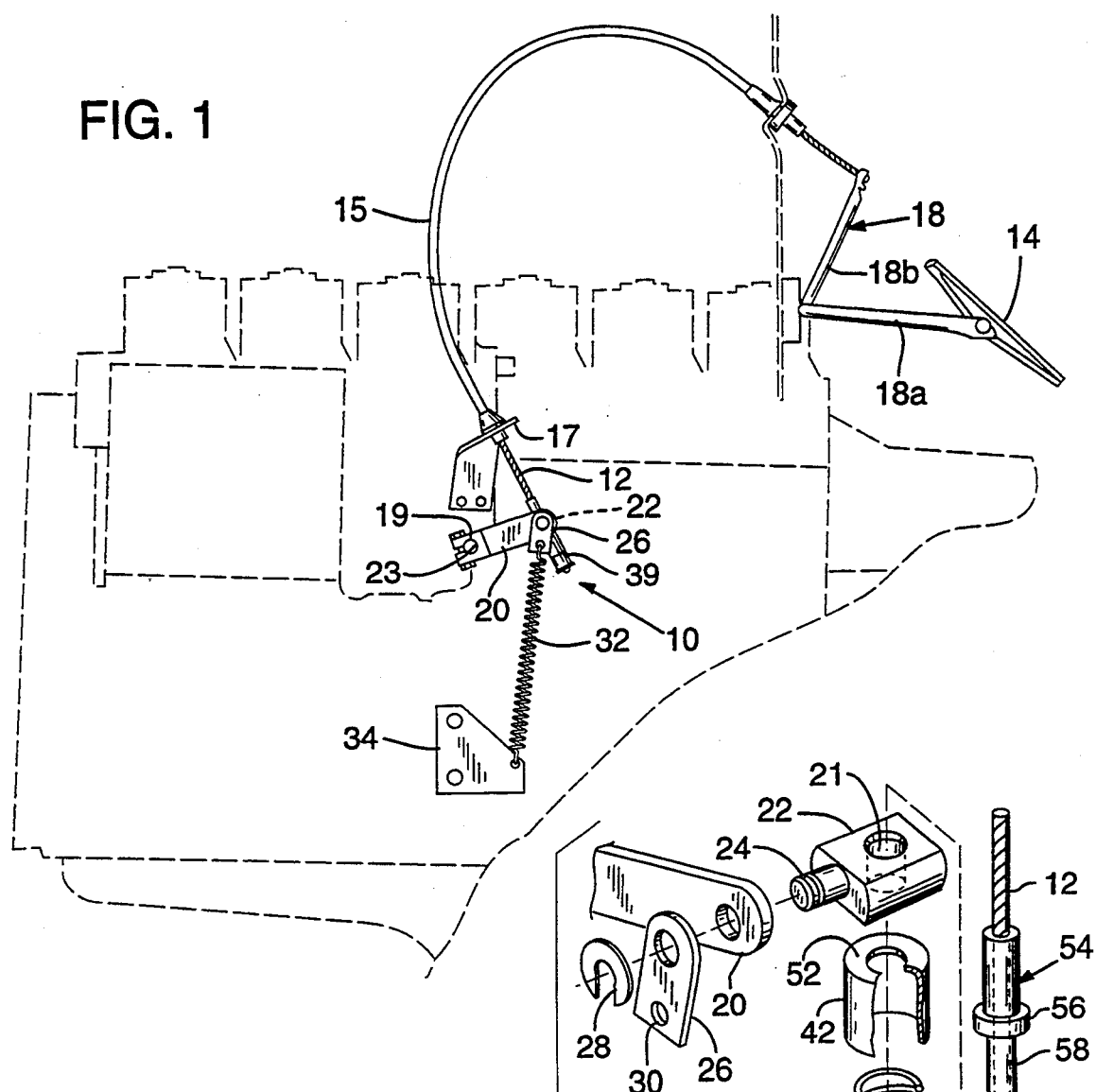
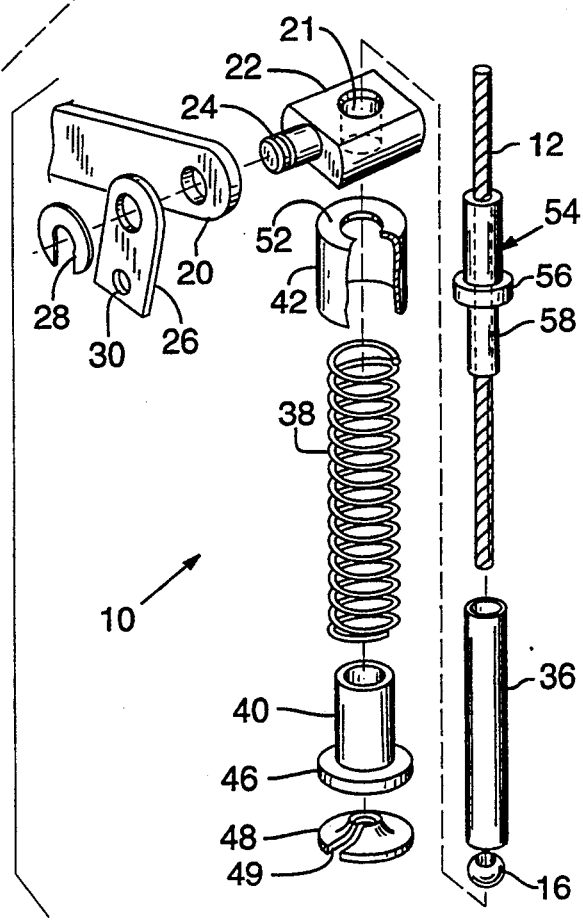

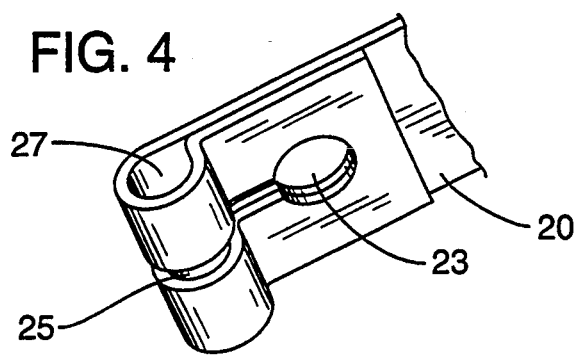
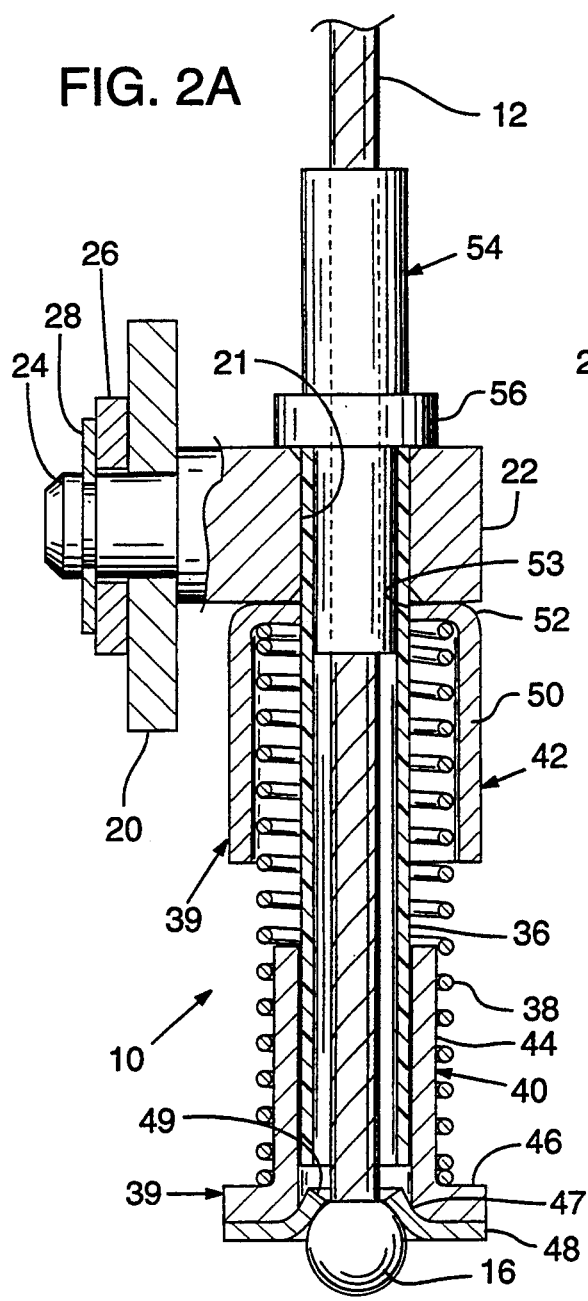
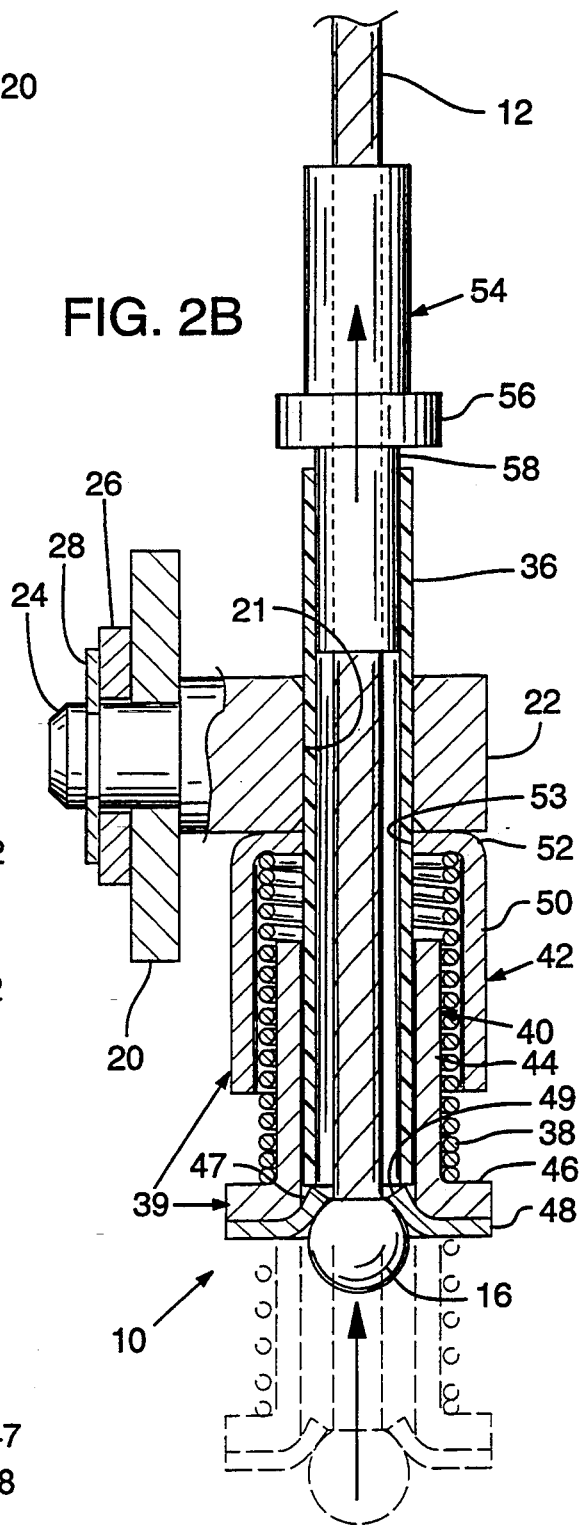

THROTTLE BREAKOVER APPARATUS

TECHNICAL FIELD

The present invention relates to an apparatus for limiting the force applied by a throttle cable to an engine throttle in response to the depression of an accelerator pedal.

BACKGROUND OF THE INVENTION

Throttle breakover devices are known for limiting the force exerted upon an engine throttle lever by a throttle cable or linkage. The throttle cable exerts the force on the throttle lever in response to the depression of an accelerator pedal through a stroke. Typically, after the lever has been moved by the cable to a maximum (full throttle) position, the accelerator pedal may still be depressed through a remaining "breakover" portion of the stroke. If the accelerator pedal and the throttle lever are unyieldingly interconnected by the cable, damage to the throttle could result from the accelerator pedal being forced through the remaining "breakover" portion of the stroke.

Because it is impractical to provide an accelerator pedal stroke which "bottoms-out" simultaneously with the throttle lever reaching the full throttle position, throttle devices are needed to limit the forces generated in the connection between the cable and the throttle lever. Typically, throttle breakover devices have a cable (or rod) with one end coupled to an accelerator pedal and the other end slidably coupled to the throttle. Often, an idle spring is provided which biases the throttle towards an idle position. In response to the accelerator pedal moving through the stroke, the cable pulls the throttle lever, against the idle spring bias, from the idle position to a maximum position. Once the full throttle position is reached, a throttle breakover device at the coupling of the throttle lever operates to absorb the breakover movement of the cable, thereby limiting the force of the cable on the throttle lever.

U.S. Pat. No. 2,312,274 to Stortz discloses one throttle breakover device. The Stortz device discloses a throttle cable supported upon an arcuate rim mounted on a throttle arm. The cable has a threaded extension which is slidably attached through a flange protruding above the distal end of the arcuate rim. A coil spring surrounds the threaded extension extending beyond the flange. The spring is held in place by an end nut threaded onto the threaded extension atop the spring, and a flange nut threaded onto the extension abutting the flange, thereby compressing the spring between the end nut and the arcuate rim flange. In this way, as the cable supported upon the arcuate rim is pulled, the rim rotates the throttle arm to the maximum position. Thereafter, the cable "breakover" movement is absorbed by the spring.

Because motor vehicle accelerator pedals are repeatedly depressed, the Stortz cable is repeatedly bent along the arcuate rim. Such repetitive bending can lead to the fatigue stress fracture of the cable. Moreover, if the cable is torsionally twisted during installation, these stresses may also contribute to cable fatigue. Another drawback of the Stortz device is the possibility that the end and flange nuts may become loosened over time due to the engine vibration. If the end nut were to detach from the extension, the cable would slip from the arcuate rim, resulting in the inability to accelerate the engine. Finally, the coil spring of the Stortz device may be subject to buckling if the spring is lengthened to accommodate a long breakover stroke.

Another example of a breakover device includes a throttle lever with independent base and upper portions which are coupled by a coil spring. After a cable pulls the lever into the full throttle position, the spring flexes to allow the upper lever portion to pivot through a breakover angle, thereby absorbing the additional movement of the cable. This device requires a lever indexing procedure for proper breakover operation.

A need exists for an improved throttle breakover apparatus that overcomes these and other disadvantages of the prior art.

SUMMARY OF THE INVENTION

It is one object of the present invention to provide an improved throttle breakover apparatus.

A secondary object of the present invention is to provide a throttle breakover apparatus with a throttle cable which is subjected to relatively little repetitive stress.

Another objective of this invention is to provide a throttle breakover apparatus which does not require indexing during assembly.

Yet another objective of this invention is to provide a throttle breakover apparatus that is conveniently disassembled, while being relatively invulnerable to accidental disassembly.

Yet an additional objective of this invention is to provide a throttle breakover apparatus that is capable of providing a long throttle breakover stroke.

A throttle breakover apparatus in accordance with one embodiment of the present invention has a throttle cable with a first end coupled to an accelerator pedal, and a second end terminating in a cable stop. The cable second end is coupled to a pivot coupling extending from a throttle lever. The pivot coupling is positioned between the cable stop and the accelerator. A cable sleeve extends over the second end of the cable from the cable stop through a coupling hole in the pivot coupling to provide a bearing surface which separates the cable from the pivot coupling.

The sleeve also slidably bears, between the cable stop and the pivot coupling, a spring guide which holds a coil spring. A fitting is affixed to the cable and abuts the pivot coupling so as to precompress the coil spring (within the spring guide) between the pivot coupling and the cable stop. A retainer such as a disk positioned between the cable stop and the spring guide provides a seat for the cable end and prevents the cable stop from pulling through the coil spring.

In addition, an idle spring attaches to the throttle lever to provide a bias toward a minimum (idle) position.

In operation, the accelerator pedal is depressed through a stroke to move the cable to pivot the throttle lever. A first portion of the stroke pivots the throttle lever, against the biasing of the idle spring, from the idle position to a first (full throttle) position. The throttle lever is mechanically stopped from pivoting past the full throttle position. As the accelerator pedal is further depressed through a breakover portion of the stroke, the cable stop moves toward the pivot coupling to compress the coil spring within the spring guide. As a result, the additional breakover movement of the cable is absorbed. As the coil spring is compressed during breakover motion, the fitting pulls away from the pivot, and the sleeve slides through the coupling hole.

As the accelerator pedal is released, the coil spring relaxes into the prestressed condition with the fitting abutting the pivot coupling. The throttle lever is thereafter urged into the idle position by the idle spring.

The present invention relates to the above-described objects and features individually, as well as collectively. These and other features, objects and advantages of the present invention will become apparent with reference to the following description and drawings.

BRIEF DESCRIPTION OF DRAWINGS

FIG. 1 is an elevational view of a throttle breakover apparatus shown coupled to an engine throttle and an accelerator in accordance with one preferred embodiment of the present invention.

FIG. 2A is a cross-sectional view of the throttle breakover assembly of the FIG. 1 embodiment of the present invention during a non-breakover operation of the assembly.

FIG. 2B is a cross-sectional view of the throttle breakover assembly of the FIG. 1 embodiment of the present invention, showing the compression of the throttle breakover assembly during the breakover operation of the assembly.

FIG. 3 is an exploded view of the throttle breakover assembly of the FIG. 1 embodiment of the present invention.

FIG. 4 is a perspective view of a portion of one form of a throttle lever in accordance with the present invention.

DETAILED DESCRIPTION OF THE ILLUSTRATED EMBODIMENT

As shown generally in FIG. 1, a throttle breakover apparatus 10 for relieving the force applied by a throttle cable to an engine throttle in accordance with one preferred embodiment of the present invention has a throttle cable 12 with a first end coupled to an accelerator pedal 14 located in a vehicle cab. The throttle cable extends into an engine compartment and has a second end terminating in a cable stop 16 (see FIG. 2A). The cable is slidably coupled to a throttle lever 20 at a position inward toward the accelerator from the cable stop 16 on the cable second end.

In the embodiment illustrated in FIG. 1, the first end of the cable 12 is coupled to an accelerator pedal support member 18. The support member 18 is generally V-shaped, having legs 18a and 18b, with the base of the "V" pivotally mounted onto a firewall separating the engine compartment from the vehicle cab. One leg 18a supports the accelerator pedal 14 and the other leg 18b attaches to one end of the throttle cable 12. With this construction, depression of the accelerator pedal 14 acts to pull the throttle cable 12 into the vehicle cab. The coupling of the cable to the accelerator pedal may be carried out in a variety of ways. Any construction which pulls the cable 12 (or equivalently a rod or other non-cable accelerator to throttle connector) in response to the depression of the accelerator pedal 14 will work with the present invention. For example, the cable may have a ball end which fits within a corresponding slot and seat in the pedal support member 18.

The throttle cable 12 extends into the engine compartment through a protective sheath 15, which is supported at one end within a cable ingress through the firewall and at the other end at a mounting plate 17 positioned near the engine throttle. The second end of the throttle cable 12 extends from the protective sheath 15 and passes through a coupling hole 21 in a pivot coupling 22. The pivot coupling extends from the throttle lever 20 (see FIGS. 2B and 3).

The cable 12 is slidably positioned within the pivot coupling 22. A tubular sleeve 36 surrounds the cable second end where it extends through the coupling hole 21 (see FIGS. 2A and 2B). The sleeve 36 optionally separates the throttle cable 12 from the pivot coupling 22 and provides a bearing surface for the cable instead of the cable bearing directly against the wall which defines the coupling hole 21. While the illustrated sleeve of this embodiment is of nylon, any suitable, preferably somewhat rigid, durable material may be used.

A biasing member is provided to restrict the motion of the cable 12 relative to the throttle 20 until such time as the throttle reaches its full throttle position and force is thereafter applied to the accelerator pedal in excess of the force applied by the biasing member. In this latter case, the biasing force is overcome and the cable moves relative to the throttle to thereby relieve excessive force on the throttle. Any suitable biasing element may be used, such as leaf springs, elastic elements, and other components which are capable of applying the desired biasing force to the cable. In the preferred form, however, the biasing element is a coil spring 38 (FIGS. 2A and 2B) which is mounted over the sleeve 36. The spring 38 extends between the cable stop and the pivot coupling 22. The spring is initially compressed, for example to a preload force of from six to twelve pounds, although this may be varied. A typical spring constant for spring 38 is four pounds per inch, although this, too, may be varied. By lengthening the spring, the permitted overtravel of the cable from the full throttle position is increased. A typical breakover travel is from twelve mm to twenty mm.

In the embodiment illustrated in FIG. 3, the coil spring 38 is restricted from distortion out of axial alignment by an optional spring guide. The spring guide may take any convenient form, but preferably the spring guide is of a two-piece construction comprised of a first or outer guide 42 and a second or inner guide 40. Referring to FIG. 2A, the outer guide 42 is tubular with an outer guide wall 50 which is in the form of a right cylindrical shell surrounding and axially aligned with the end of the coil spring 38 adjacent to the pivot coupling 22. The outer guide wall 50 fits closely around the exterior of the coil spring 38 and reinforces the coil spring against buckling. The outer guide 42 also has a radially inwardly protruding flange 52 positioned over the end of the coil spring to provide a seat for receiving the coil spring 38 between the coil spring and the pivot coupling 22. The flange 52 has a central opening defined by a circular wall 53 which receives and provides a bearing surface for the sliding sleeve 36.

As shown in FIGS. 2A and 2B, the inner guide 40 has a cylindrical inner guide wall 44 axially aligned with and inserted into the interior of spring 38. Wall 44 separates the sleeve 36 from the interior of the coil spring 38. It should be noted that sleeve 36 may be integral with spring guide 40 with the spring guide wall 44 functioning as the sleeve. Guide 40 is located at the end of the spring adjacent to the cable stop 16. The interior wall 44 provides a bearing surface against the sleeve 36. The inner guide wall 44 fits closely within the coil spring 38 and also reinforces the coil spring against buckling. The inner guide 40 further has a radially outwardly projecting flange 46 protruding outwardly beyond the end of the spring 38 adjacent the cable stop 16. The flange 46 provides a seat for the abutting end of the spring 38. The illustrated flange 46 is circular with an annular bevel 47 to provide a receiving cup-like surface which receives the apex of a somewhat frustoconical disk 48. The disk 48 separates the spring guide 40 and the cable stop 16.

Also, in the illustrated construction, as the spring 38 is compressed, the guide components 40, 42 telescope together as shown in FIG. 2B to enhance the reinforcement of spring 38 against deformation or buckling.

It should be understood that the spring guide of the present invention may have a variety of configurations. For instance, the positions of the inner and outer guides 40, 42 may be reversed. Alternatively, either of the inner and outer guides 40, 42 may be used alone, especially when a spring 38 of relatively short length is used in the throttle breakover apparatus. Furthermore, it is within the scope of this invention to completely dispose of the spring guide. In this case, the sleeve 36, if used, would provide the reinforcement against buckling.

The disk 48 provides a seat for the cable stop 16 and prevents the cable stop from being pulled through the spring (see FIGS. 2A and 2B). As shown in FIG. 3, the disk may have a slot 49 extending from the perimeter to the center of the disk. The slot 49 receives the cable 12 adjacent to the stop 16 as the disk 48 is slid in and out of its assembled position between the flange 46 and the cable stop 16. Thus, the slotted disk 48 allows convenient assembly and disassembly of the throttle breakover apparatus. The somewhat frustoconical shape of the disk 48 provides a concave or curved seat for the cable stop 16. The projecting configuration of the apex 49 of disk 48 enhances the integrity of the throttle breakover apparatus construction. That is, the positioning of the apex 49 within the interior of the inner guide 40 minimizes the risk of stop 48 being inadvertently shaken loose from the throttle breakover apparatus by engine vibration. Preloading of the spring 38 also assists in retaining the stop 48 in place on the cable 12.

Furthermore, by providing a concave or curved stop 48, together with a bearing surface of cable stop 16 which is curved, and more specifically spherical or ball-shaped, relative rotation or slippage of cable end 12 relative to the stop or disk 48 and the assembly 10 is facilitated, thereby relieving torsional twisting of the cable 12. As shown in FIGS. 2A, 2B, and 3, the cable slippage is enhanced in the preferred embodiment by providing a cable stop 16 in the shape of a ball. The slip feature enhances the life of cable 12 by reducing stress on the cable. It should be understood that any seat and cable end configuration, to the extent the configuration allows this slippage, will provide this benefit and may be used.

As mentioned above, the coil spring 38 is precompressed when the throttle lever 20 is at an idle (minimum throw) position. The condition of the throttle breakover apparatus under non-breakover conditions is illustrated in FIG. 2A. To provide the precompression of the coil spring 38, a fitting 54 is fixed on the cable 12 between the pivot coupling 22 and the accelerator pedal 14. The illustrated fitting is shown positioned in abutment to the pivot coupling and on the cable such that the cable stop 16 is pulled toward the pivot coupling 20 to precompress the spring 38. The fitting 54 of the illustrated embodiment is swaged or otherwise secured onto the cable 12, and has an enlarged abutment flange 56 which contacts the pivot coupling 22. An extension portion 58 of a reduced cross-sectional dimension extends from the abutment flange 56 into the end of the sleeve 36. Preferably the interior dimension of sleeve 36 is of the same dimension as the exterior dimension of the extension portion 58. Consequently, relative motion between sleeve 36 and extension portion 58 is substantially eliminated. As a result, the cable is restricted to move substantially in the axial direction through the pivot 22. Prior to throttle breakover, the extension 58 is positioned through the coupling hole 21.

As shown in FIG. 1, the pivot coupling 22 extends from and is pivoted to a first end of the throttle lever 20. The pivot coupling has a protruding cylindrical pivot extension 24, which is inserted through a hole through the first end of the throttle lever 20 (see FIG. 3). The distal end of the pivot extension 24 extends through the throttle lever 20 and an idle spring receiving bracket 26 which provides an attachment location for an idle spring 32. Bracket 26 is pivoted to pivot extension 24. A fastener 28, which may comprise a snap fastener which fits into a groove on pivot extension 24, retains the throttle 20 and bracket 26 on the pivot extension. The idle spring extends from bracket 26 to an idle spring anchor plate 34, which is mounted within the engine compartment below the throttle lever 20. Alternatively, bracket 26 may be eliminated, in which case the idle spring may, for example, simply be connected directly to the throttle lever 20, such as through a hole in the throttle lever. The idle spring 32 is conventional and may be an elongated coil spring, which is under a slight tensile stress when the throttle lever 20 is in the idle position. It is to be understood that any idle biasing mechanism may be used instead of spring 32.

A second end of the throttle lever 20, opposite to the distal end which receives the pivot extension, is mounted on a pivot pin 19. Pin 19 projects from a throttle housing (not shown, e.g. of a carburetor, a fuel pump, etc.) positioned in the engine compartment. The engine speed is adjusted by pivoting throttle 20 to pivot the throttle pin 19. In the embodiment illustrated in FIG. 1, pin 19 is inserted through a pin aperture 23. The throttle has a slot 25 extending from the end of the throttle to the aperture 23. Bolts, screws, or other fasteners are inserted through an opening 27 through the end of the throttle and are tightened to narrow the slot 25 and secure the throttle onto the pin 19. With this optional construction, the throttle may be freely rotated to any desired position on the pin 19 and then secured to pin 19. Thus, the throttle need not be placed in specific indexed positions defined by grooves in the pin.

The throttle lever 20 may therefore be positioned on the pivot pin 21 at, for example; an idle position which corresponds to the corresponding position of the second end of the throttle cable 12. To install the apparatus of the invention, the throttle pivot pin 19 may be placed in the idle position with the throttle lever 20 and attached breakover apparatus 10 then being mounted to the pin 19. Accordingly, the subject invention dispenses with a need for the precise indexing of the throttle lever on the pivot pin 19.

Referring to FIG. 1, the operation of the throttle breakover apparatus will now be described. The bias of the idle spring 32 maintains the throttle lever 20 in the idle position when the accelerator pedal 14 is not depressed. Depression of the accelerator pedal through a stroke (usually by a driver within the cab of the vehicle) pulls the throttle cable 12, and applies a force on the throttle lever 20. This pivots the throttle 20 upwardly or counter-clockwise in FIG. 1 and accelerates the engine. The idle spring 32 stretches to accommodate the throttle lever motion. The throttle lever 20 pivots until the full throttle position is reached, at which point further movement of the throttle lever 20 is mechanically stopped (by a stop not shown). The coil spring 38, having a much greater spring force constant than the idle spring, does not significantly deflect as the throttle lever 20 is pivoted from the idle position to the full throttle position.

In the event the accelerator pedal is depressed beyond the full throttle position, and thus through an additional breakover portion of the stroke, and because the throttle lever 20 is stopped from further pivoting, the coil spring 38 compresses to absorb the breakover movement of the throttle cable 12.

As best seen in FIG. 2B, as the throttle cable 12 continues to move after the throttle lever 20 has reached the full throttle position, the cable stop 16 moves toward the pivot coupling 22 and compresses the coil spring 38 within the inner guide 40 and the outer guide 42. As the coil spring 38 is compressed, the sleeve 36 is pulled through the coupling hole 21 of the pivot coupling 22, and the fitting 54 moves away from the pivot coupling 22. In this way, the throttle cable 12 can move through the breakover portion of the stroke without damaging the throttle lever 20, the pivot pin 19, or other components of the apparatus.

The throttle breakover apparatus illustrated in the drawings has a breakover stroke corresponding to the compressible length of the coil spring 38. It is to be understood that a throttle breakover apparatus in accordance with this invention may have a longer coil spring in order to provide a longer breakover stroke length or a shorter coil spring to provide a shorter breakover stroke length. Therefore, the apparatus provides a mechanism for varying the length of the breakover stroke.

When the pressure on the accelerator pedal 14 is released, the throttle breakover apparatus automatically returns the throttle lever to the idle position shown in FIG. 2A and the idle spring 32 moves the throttle to the idle position. Thus, when the accelerator pedal is released from the bottom of the breakover portion of the stroke, the coil spring 38 expands. The expansion of coil spring 38 retracts the sleeve 36 back through the coupling hole 21 until the coil spring 38 reaches its precompressed condition. Thereafter, the idle spring 32 contracts to pivot the throttle lever 20 back to the idle position, thus moving the accelerator pedal 14 back to the idle position.

This detailed description is set forth only for purposes of illustrating examples of the present invention and should not be considered to limit the scope of the claims to the invention in any way. Clearly, numerous additions, substitutions and modifications can be made to these examples without departing from the scope of the invention. We claim any and all modifications which fall within the scope of the following claims.

I claim:

1. A throttle breakover apparatus for limiting force applied by a throttle cable to an engine throttle upon the movement of the engine throttle to a first or full throttle position, the cable being slidably coupled to the throttle at a first end portion and coupled to an accelerator at a second end portion, the movement of the throttle being in response to the movement of the cable by the accelerator, the apparatus comprising:
    a cable stop on the cable at a location spaced from the throttle, and wherein the throttle is positioned between the cable stop and the accelerator;
    a cable sleeve surrounding the cable and extending from the first end portion of the cable toward the throttle, the cable sleeve providing a bearing surface which separates the cable from the throttle; and
    a biasing member outside of the cable sleeve and coupled to the cable stop and the throttle to apply a biasing force to limit movement of the cable stop toward the throttle until the throttle is in the first position.

2. A throttle breakover apparatus according to claim 1, further comprising:
    a retainer on the cable located to provide a seat for the stop to prevent the stop from pulling through the biasing member.

3. A throttle breakover apparatus according to claim 2, wherein the retainer is a disk having a slot through which the cable may be inserted so as to allow the removal of the disk from the cable, thereby enabling the disassembly of the breakover apparatus.

4. A throttle breakover apparatus according to claim 2, the throttle further comprising a throttle lever and a throttle pivot pin, the throttle lever being rotatable about the pin to any angular position relative to the pivot pin.

5. A throttle breakover apparatus according to claim 4 including a pivot coupling the throttle breakover apparatus to the throttle lever, the pivot coupling minimizing bending of the cable as the throttle moves to the first position.

6. A throttle breakover apparatus according to claim 5, wherein the biasing member is a coil spring.

7. A throttle breakover apparatus according to claim 6, further comprising:
    a biasing member guide having a first guide portion positioned adjacent to the retainer, the first guide portion having an inner spring guide surface disposed within the spring and bearing on the sleeve, the first guide portion also having a projecting flange which engages the spring and provides a seat coupled to the retainer, the biasing member guide reinforcing the spring against buckling.

8. A throttle breakover apparatus according to claim 7, wherein the biasing member guide further comprises a second guide portion positioned adjacent to the pivot coupling, the second guide portion having an outer guide surface disposed outside the spring, the second guide portion also having a projecting flange which engages the spring and separates the spring and the pivot coupling.

9. A throttle breakover apparatus according to claim 6, further comprising:
    a biasing member guide carried by the cable with a first guide portion within the spring at one end of the spring and a second guide portion outside the spring at the end of the spring opposite to said one end, the first and second guide portions telescoping together as the spring is compressed.

10. A throttle breakover apparatus according to claim 6, further comprising:
    a precompression stop on the cable positioned between the throttle and the accelerator and located so as to apply compression to the spring upon assembly of the throttle breakover apparatus.

11. A throttle breakover apparatus according to claim 2, wherein the cable stop includes a rounded surface capable of rotative slip relative to the retainer to relieve twisting stress in the cable.

12. A throttle breakover apparatus integrated with an engine for limiting force applied by a throttle cable to an engine throttle upon the movement of the throttle beyond a first or full throttle position, the cable being slidably coupled to the throttle at a first end portion and coupled to an accelerator at a second end portion, the movement of the throttle being in response to the movement of the cable by the accelerator, the apparatus comprising:
   an engine;
   a throttle;
   an accelerator;
   a linkage coupling the throttle and the engine to enable the throttle to regulate the speed of the engine;
   a cable coupling the accelerator to the throttle so that movement of the cable moves the throttle;
   a cable stop on the cable at a location spaced from the throttle with the throttle positioned between the cable stop and the accelerator;
   a cable sleeve surrounding the cable and extending from the first end portion of the cable toward the throttle, the cable sleeve providing a bearing surface which separates the cable from the throttle; and
   a biasing member outside of the cable sleeve and coupled to the cable stop and the throttle to apply a biasing force to limit movement of the cable stop toward the throttle until the throttle is in the first position.

13. A throttle breakover apparatus according to claim 12, including a retainer on the cable in position to provide a seat for the stop, the retainer comprising a disk positioned on the end of the biasing member, said disk having a slot so as to allow removal of the disk from the cable to enable disassembly of the throttle breakover apparatus.

14. A throttle breakover apparatus according to claim 13 in which the biasing member comprises a coil spring, the apparatus also including a biasing member guide with at least one elongated coil spring guide surface which engages the spring to reinforce the biasing member against buckling.

15. A throttle breakover apparatus according to claim 14 in which the biasing member guide includes first and second guide portions each with an elongated spring guide surface, the first guide portion having a spring guide surface within the spring and the second guide portion having a spring guide surface outside of the spring.

16. A throttle breakover apparatus according to claim 12, wherein the sleeve is made of nylon.

17. A throttle breakover apparatus for limiting the force applied by a throttle cable to an engine throttle upon the movement of the throttle to a first or full throttle position, the cable being slidably coupled to the throttle at a first end portion and coupled to an accelerator at a second end portion, the movement of the throttle being in response to the movement of the cable by the accelerator, the apparatus comprising:
   a cable stop on the first end portion of the cable at a location spaced from the throttle and with the throttle positioned between the cable stop and the accelerator;
   a cable sleeve surrounding the cable and extending from the first end portion of the cable toward the throttle, the cable sleeve providing a bearing surface which separates the cable from the throttle;
   a coil spring having first and second ends and positioned outside of the cable sleeve and coupled to the cable stop and the throttle to apply a biasing force to limit movement of the cable stop toward the throttle until the throttle is in the first position;
   a disk positioned to provide a seat for the cable stop, said seat allowing the cable stop to rotatably slip to relieve stress in the cable, said disk further having a slot so as to allow the disk to be removed from the cable to enable disassembly of the throttle breakover apparatus;
   a precompression stop on the cable between the throttle and the accelerator at a position which precompresses the coil spring between the cable stop and the throttle; and
   a spring guide comprising an inner guide disposed within the spring adjacent the disk, and bearing on the sleeve, the inner guide having an outwardly projecting flange which engages the first end of the spring and provides a seat for the disk, the spring guide also including an outer guide surrounding a portion of the spring, the outer guide having a inwardly projecting flange bearing upon the sleeve and engaging the second end of the spring, the spring guide reinforcing the spring against buckling.

* * * * *